J. B. KIRBY.
WASHING MACHINE.
APPLICATION FILED NOV. 20, 1916.

1,323,774.

Patented Dec. 2, 1919.
6 SHEETS—SHEET 1.

Inventor,
James B. Kirby.
Hull, Smith
Brock & West
Attys.

J. B. KIRBY.
WASHING MACHINE.
APPLICATION FILED NOV. 20, 1916.

1,323,774.

Patented Dec. 2, 1919.
6 SHEETS—SHEET 2.

Inventor,
James B. Kirby.
By Hull Smith Brock & West
Attys.

J. B. KIRBY.
WASHING MACHINE.
APPLICATION FILED NOV. 20, 1916.

1,323,774.

Patented Dec. 2, 1919.
6 SHEETS—SHEET 3.

Inventor,
James B. Kirby.
By Hull Smith Brock & West
Attys.

J. B. KIRBY.
WASHING MACHINE.
APPLICATION FILED NOV. 20, 1916.

1,323,774.

Patented Dec. 2, 1919.
6 SHEETS—SHEET 5.

Inventor,
James B. Kirby.
By Hill, Smith, Bean & West,
Attys.

UNITED STATES PATENT OFFICE.

JAMES B. KIRBY, OF CLEVELAND, OHIO.

WASHING-MACHINE.

1,323,774. Specification of Letters Patent. Patented Dec. 2, 1919.

Application filed November 20, 1916. Serial No. 132,245.

*To all whom it may concern:*

Be it known that I, JAMES B. KIRBY, a citizen of the United States, residing at Cleveland, in the county of Cuyahoga and State of Ohio, have invented a certain new and useful Improvement in Washing-Machines, of which the following is a full, clear, and exact description, reference being had to the accompanying drawings.

This invention relates to washing machines and has for its general object the provision of new, improved, and simplified mechanism for forcing cleansing liquids through the fabrics, and afterward removing the liquids therefrom. In the performance of my said invention I preferably employ a fabric-receiving tub or container of perforated or foraminous material movably supported within a liquid-containing casing in such a manner as to support the fabrics for washing purposes, and after washing to be elevated above the liquid surface and rotated at a high speed for removing adherent liquid from the fabrics. Subsidiary objects of my invention are the provision of new and improved means for operating the washing devices; the provision of means whereby clothing or fabrics deposited within the tub or container may be automatically distributed therearound so as to be substantially balanced for wringing purposes; the provision of new and improved means for varying the relative position between the washing devices and the tub or container so that all portions of the fabrics may be efficiently cleansed; the provision of a construction wherein the washing operation shall be independent of the amount of clothing or fabrics operated upon at one time and in which the mechanism cannot be stalled or broken by an excess; the provision of a simple, strong, and reliable mechanical construction whereby the machine may be rendered safe in the hands of careless, unskilled or inattentive workers; while further objects and advantages will become apparent as the description proceeds.

In the drawings accompanying and forming a part of this application I have illustrated a certain preferred embodiment of my invention, the same resembling closely the mechanism illustrated and described in my prior application filed July 19, 1915, Serial No. 40,555 of which the present application is a division as to so much of the subject matter as is common thereto; certain portions, means and attributes of this mechanism being also common to my still earlier application filed January 28, 1915, Serial No. 4,906 of which the present application is a division as to all subject matter which is common thereto; and other features of construction and operation being now for the first time exhibited in patent drawings. In these drawings

Figures 6, 7, 8, 16, 17:
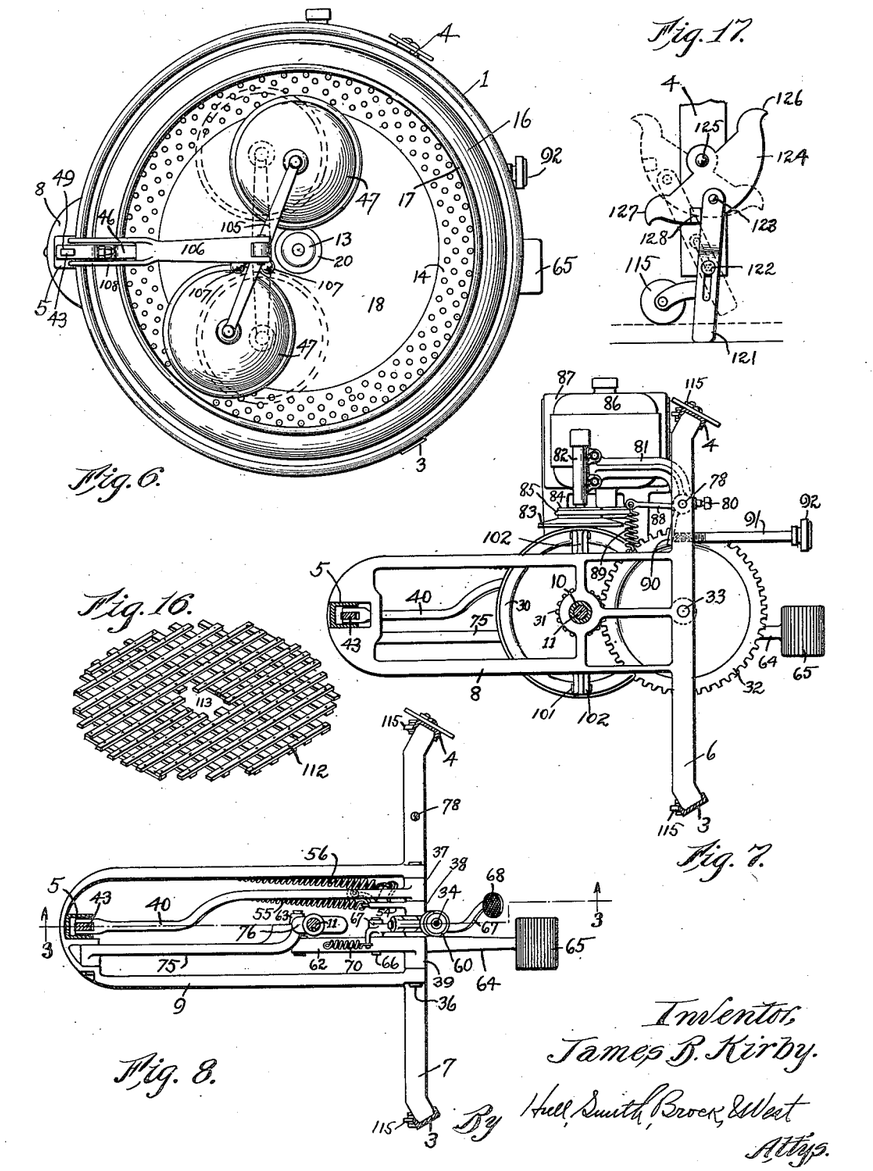
Fig. 6 is a top plan view of my improved washing machine, the cover being omitted.
Figs. 7 and 8 are cross sectional views on the lines 7—7 and 8—8, respectively, of Fig. 1.
Fig. 16 is a perspective view of the anti-splashing plate.
Fig. 17 is a detail view of the casing-tilting device.
Figure 9:
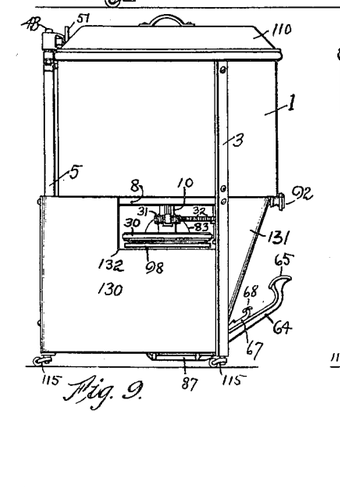
Figs. 9 and 10 represent side and front elevations, respectively, of the complete machine including the housings.
Figure 10:
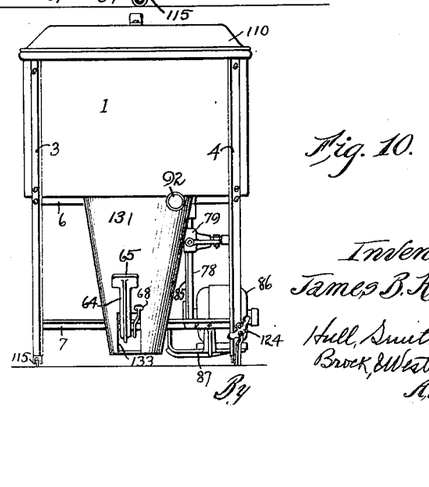
Figure 11:
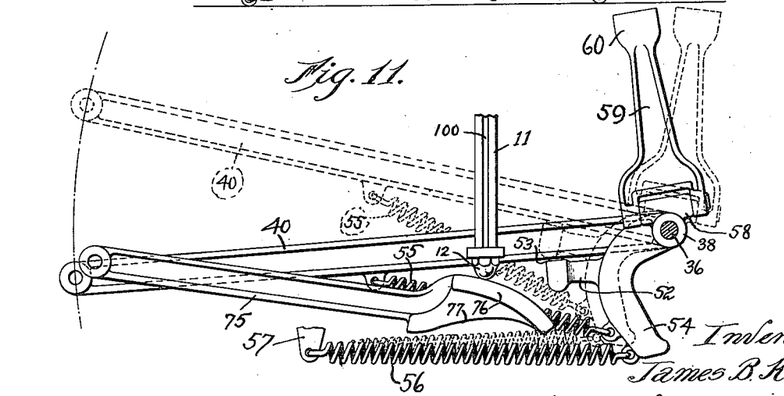
Fig. 11 is a detail view drawn to enlarged scale showing the pounder-operating devices in their extreme positions of operation.
Figure 12:
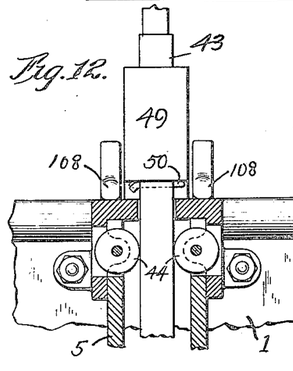
Fig. 12 is a detail view illustrating the preferred mode of supporting and guiding the pounder rod.
Figure 13:
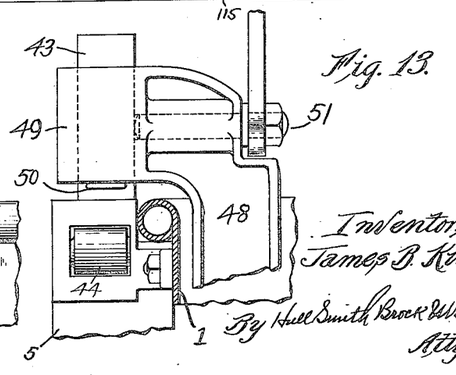
Fig. 13 is a detail view showing one mode of connecting the pounder arm to said operating rod.

Describing the parts by reference characters, 1 represents the outer casing or receptacle of my improved machine, the same being preferably of metal and having a cylindrical side wall and a flat bottom wall 2, the whole being supported at a convenient height by a suitable framework and having its axis substantially vertical. This framework preferably consists of three vertical legs 3, 4, 5, extending from the floor to the top of the casing 1. The legs 3 and 4 are preferably connected by two horizontal bars 6 and 7, respectively, the former serving as a support for the casing and the latter being located near the lower ends of the legs and forming a support for one end of the operating mechanism. Integral with these bars and projecting horizontally rearwardly therefrom are the U-shaped frames 8 and 9, respectively, whose rearward ends encircle and are secured to the leg 5, this rearward leg being preferably of a hollow channel bar, as shown in Figs. 7 and 8, for a purpose to be hereafter disclosed.

Figure 3:
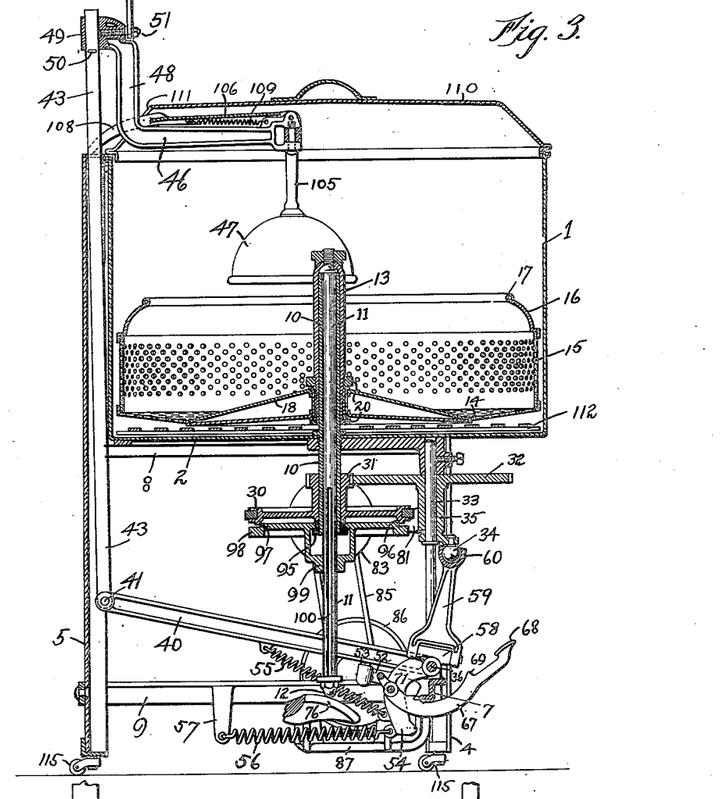
Fig. 3 is a vertical central sectional view of my improved washing machine corresponding substantially to the line 3—3 of Fig. 8.

Carried by the frame 8 is the vertical bearing-sleeve 10 which projects through the bottom wall 2 of the casing to a considerable distance above the bottom thereof as shown in Fig. 3, leakage around the same being prevented in any suitable manner as by packing. Slidably and rotatably journaled inside said sleeve is the vertical shaft 11, having at its lower end a suitable anti-friction bearing 12, here shown as a rounded cap formed with an enlarged base, and having rigidly secured to its upper end the vertical sleeve 13 which freely surrounds the upper end of the sleeve 10. Carried by the sleeve 13 is the tub or container having a bottom indicated generally by 14, an upright cylindrical side wall 15, the latter preferably surmounted by a coping 16 formed with a rolled rim 17. Preferably the outer portion of the tub bottom 14 is also perforated, although I preferably make a portion of the tub bottom of double thickness by using a separate plate 18 concentric therewith and joined thereto in a peculiar manner to provide a truss construction of great stiffness, which however I do not claim in this application but in a separate application filed for that purpose. In the present embodiment I have illustrated the tub as secured to the sleeve 13 by means of jam nuts 20—20 secured thereon, although any suitable or convenient expedient could be employed.

Rotatably journaled upon the exterior of the sleeve 10 is a friction wheel 30 to which is rigidly secured the pinion 31 which meshes with the gear 32 journaled to the stud 33 carried by the bar 6, and operatively connected to the gear 32 is the eccentric pin 34 by means of which motion is transmitted to the pounder mechanism. In the present embodiment the pin 34 is carried by the hub 35 of the gear 32 and the pin 34 is spherical in shape, although it will be obvious that other constructions could be employed.

Secured to the upper side of the bar 7 is a horizontal pivoting member 36 upon which are hinged three sleeves 37, 38, and 39. Projecting from the sleeve 37 is an arm 40 whose free end is articulated at 41 to the vertically reciprocable rod 43. This rod is located inside the hollow leg 5, heretofore mentioned, and is guided in its reciprocation by suitable anti-friction members such as the rollers 44. Secured to the upper end of this rod is the horizontal arm 46 whose free end normally projects over the tub and supports the pounders, here shown as hollow downwardly opening bells or cones 47—47. At the part nearest to the rod 43 the arm 46 is formed with a vertical portion 48 spaced from said road a sufficient distance to permit the wall of the casing 1 to be received therebetween, and the upper end of this portion 48 terminates in a socket portion 49 adapted to receive snugly the upper end of the rod 43 which is preferably provided with a stop 50 to fix the position of said socket. Suitable means such as the set screw 51 are employed to hold the arm in place. The peculiar movements and functions of these bells will be pointed out more at length hereafter.

The sleeve 38 carries a rigid arm 52 whose end engages the lower part of the arm 40, a rubber cushion 53 being shown in the present instance. The sleeve 38 also carries a depending branch 54 which is connected by means of a tension spring 56 with a suitable part of the fixed frame work such as the ear 57 carried by the member 9, the effect of this spring being to tend to raise the arm 40 and hence to counterbalance the weight of the bells 47 and their associated parts. The upper side of the sleeve 38 carries a boss 58 to which is pivoted the operating lever 59, whose upper end is formed with a cup 60 receiving the ball 34.

Figure 4:
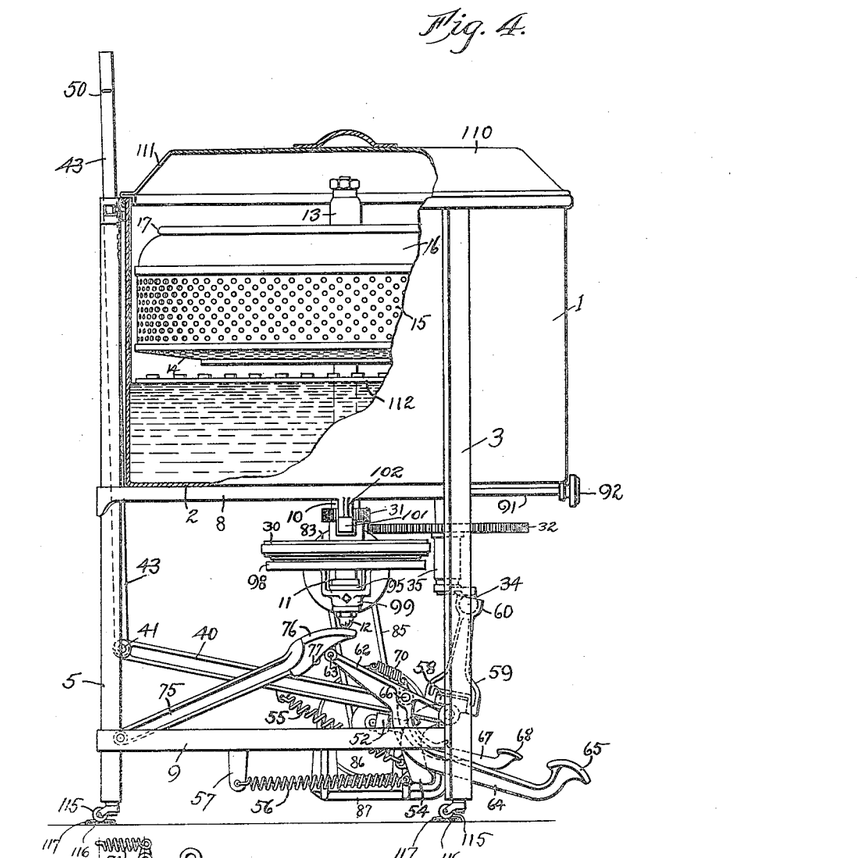
Fig. 4 is a view similar to Fig. 1 showing the tub in elevated or wringing position and the washing devices completely displaced.
Figure 5:
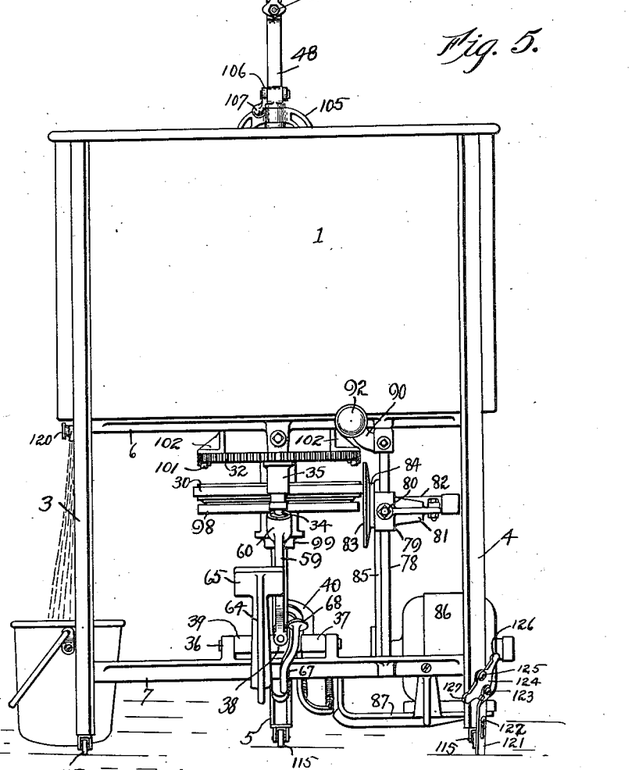
Fig. 5 is a front elevational view of my improved washing machine showing the same inclined for draining and omitting the housings.
Figure 14:
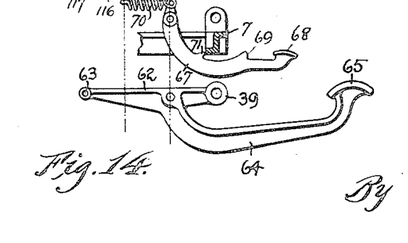
Fig. 14 is a detail view showing the shape and arrangement of the pedals.
Figure 15:
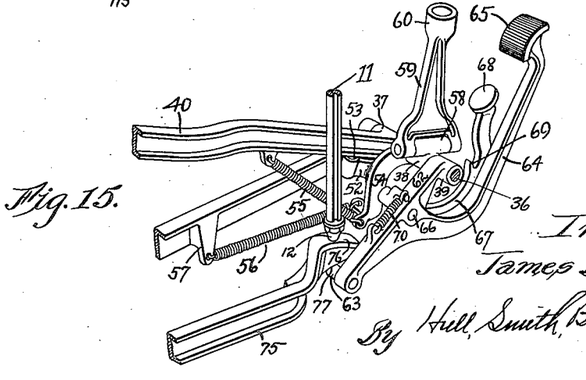
Fig. 15 is a perspective view of a portion of the operating mechanism.

Projecting from the sleeve 39 is the arm 62 whose free end carries a laterally extending pin 63. From the lower side of the arm 62 at some little distance from the sleeve 39 extends the pedal 64 ending in the foot plate 65. This pedal extends first downwardly for a distance from the arm, then longitudinally, and finally upwardly to the foot plate, this peculiar formation being adapted from the fact that the member 36 is supported above the horizontal bar 7, and the pedal is carried around beneath said bar. Intermediate of its length the arm 62 also carries a horizontal pin 66 on which is pivoted the trigger lever 67 which ends in a toe plate 68 adjacent to and forward of the foot plate 65. The upper edge of this trigger lever is provided with a notch or shoulder 69 adapted to catch against the edge of the bar 7 when the pedal 64 has been fully depressed as shown in Fig. 4, and a spring 70 connected to the arm 62 and to the locking lever tends to hold the same in securing position. I have also shown the lever 67 as formed with a second shoulder 71 to hold the arm 62 in horizontal position by engaging against the bar 7 in the manner illustrated in Fig. 14.

Pivoted at the rearward end of the frame 9 upon a transverse horizontal axis is the arm 75 whose forward end terminates in a curved upwardly facing shoe 76 receiving the bearing cap 12, while the lower part of said shoe constitutes a curved track 77 which rests upon the pin 63, which may, as illustrated in Fig. 8, have a roller sleeved thereon if desired. The curvature of the track 77 is so chosen as to afford an even bearing upon the pin 63 as the pedal 64 is moved from the position shown in Fig. 2 to that shown in Fig. 4, and it will be seen that this movement serves to elevate the tub 15 from the lower to the upper part of the casing 1, the shaft 11 being slidably received in the bearing 10 for this purpose. Also the upper face of the shoe 76 is curved in such a manner that the bearing cap 12 shall rest substantially normal upon it at all times so as to constitute a thrust bearing of small friction whatever be the position of the tub 15; also the length of the shaft 11 and the position of the shoe 76 is so adjusted that even in depressed position the tub 15 is supported out of engagement with the bottom of the casing.

Journaled in the bars 6, 7 is an upright rock shaft 78 on which is adjustably clamped the sleeve 79 by any suitable means such as the set screw 80. Projecting horizontally from this sleeve is an arm 81 whose extremity is provided with a journal box 82 in which is journaled a lay shaft carrying at its free end the friction disk 83 which rests against the friction wheel 30. Rotatable with this friction disk is a pulley 84 connected through the belt 85 to an electric motor 86 mounted on a shelf 87 carried by the machine frame. A second arm 88 projecting laterally from the sleeve 79 is connected to the frame 8 by means of a tension spring 89 which serves to draw the friction disk against the edge of the wheel 30 in driving relation; while a third arm 90 also carried by the sleeve 79 is engaged by the end of the threaded rod 91 provided with a milled head 92 or other convenient end at some accessible portion of the machine so that by screwing the same inwardly the tension of the spring 89 may be overcome and the disk 83 disengaged from the friction wheel 30 which will immediately stop the machine. I find this arrangement preferable to the expedient of mounting the disk 83 directly upon the motor shaft and mounting this motor upon a movable shelf, since the vibration of the mechanism when imparted to the heavy motor will sometimes overbalance the tension of the spring 89 and cause chattering or uneven driving; while the weight of the movable parts here described is so small compared with the strength of this spring that steady driving is assured, and the flexibility of the belt is ample for the small range of movement required between operating and non operating positions.

The hub of the wheel 30 is loosely sleeved upon the exterior of the bearing 10, and is longitudinally movable upon said bearing, being fixed in its lower position by means of a suitable collar 95 (see Fig. 3). The position of the friction disk 83 relatively to this wheel determines the speed of the mechanism during the washing operation, but this can be adjusted as desired by moving the sleeve 79 along the shaft 78.

The lower face of the wheel 30 is formed with a conical friction surface 96 complementary to a second friction surface 97 carried by a rotatable disk 98 immediately therebeneath. This disk is formed with a hub 99 loosely embracing the shaft 11 so as to be movable longitudinally thereof, but prevented from rotating relatively thereto as by being splined to the elongated key-way 100 formed in the side of this shaft. During the time that the shaft 11 is in its lowered position as shown in Fig. 3, the wheel 30 rests upon the collar 95 as heretofore explained and the disk 98 is also supported slightly beneath an outer contact with this wheel as shown in Fig. 3, the collar 95 being made with two shoulders for this purpose. However, when the shaft 11 is raised sufficiently, the enlarged portion of the cap 12 is brought into contact with the hub 99 so that the disk is raised out of contact with the collar and the surface 97 brought into engagement with the surface 96 of the wheel 30, which wheel is also then raised along the member 10 so as to cause the pinion 31 to become disconnected from the gear 32. The motion of the arm 40 and its associated parts is therefore arrested, and the tub 15 is given a motion of rapid rotation, the speed of which is enhanced by the elevation of the wheel 30 past the friction disk 83. During this locked position of the pedal 64 the upper face of the wheel 30 is supported just beneath but not touching the brake shoes 101, 101 which are carried by the brackets 102, 102 projecting from the frame member 8. The pedal 64 is given sufficient additional freedom of movement to permit the elevation of wheel 30 into contact with these brake shoes when it becomes necessary to stop the tub's rotation.

The bells 47 have two functions, one thereof being the washing of the clothes contained in the tub 15, and the other being the uniform distribution of the clothing about such tub so as to be substantially balanced for the centrifugal wringing operation which is to follow; and these functions are facilitated and enhanced, particularly as to the distribution feature, by the following construction: Two bells are preferably employed, which I find better than any other number, although I do not restrict myself thereto, said bells being secured to the ends of a curved yoke 105, pivoted upon a vertical axis to the extremity of the arm 46, this pivot being preferably somewhat eccentric to the tub 15 as shown particularly in Fig. 6. The size of the bells is not of vital importance, although I prefer to have them largely fill the free space of the tub existing between the outer wall and inner sleeve, since in this way more efficient washing is secured. Pivoted to the side of the arm 46 at a point adjacent the free end thereof is a lever 106, having at its forward end a pair of ball-shaped fingers 107, 107 which depend one on each side of the yoke 105 at a point near one side of its pivot. The body of this lever overlies the horizontal part of the arm 46 and is forked at its rearward end forming two prongs 108 which straddle the upright portion 48 of said arm and rest upon the upper end of the leg 5. Underneath the arm 106 is located a tension spring 109 having one end connected to the arm 46 and the other to the arm 106 so as to tend to maintain the latter in depressed position.

Figure 1:
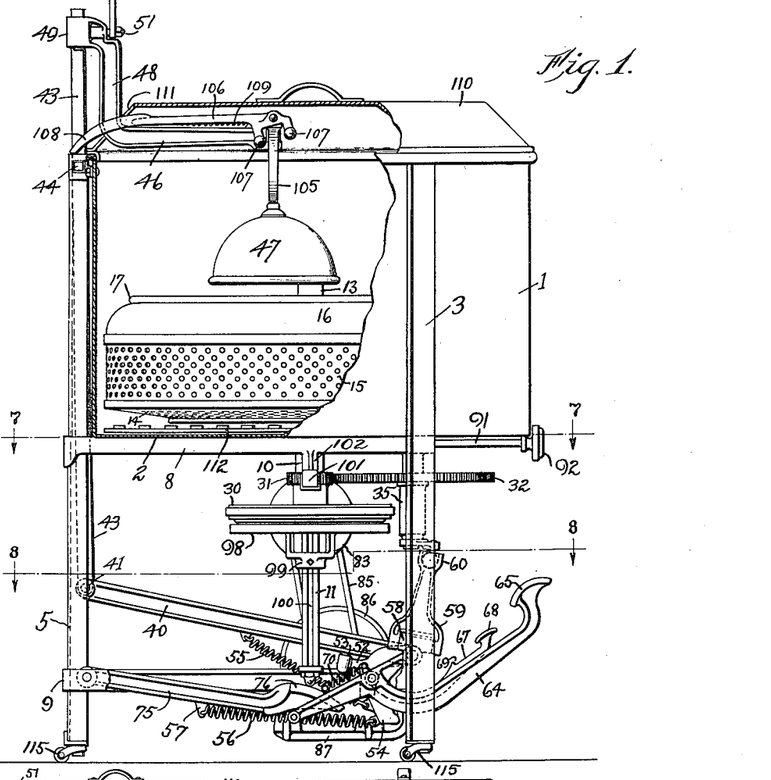
Figure 1 is a side elevational view of my improved washing machine, certain parts being partly broken away, and the housing for the mechanism omitted, the washing devices being at the upper limit of their stroke.
Figure 2:
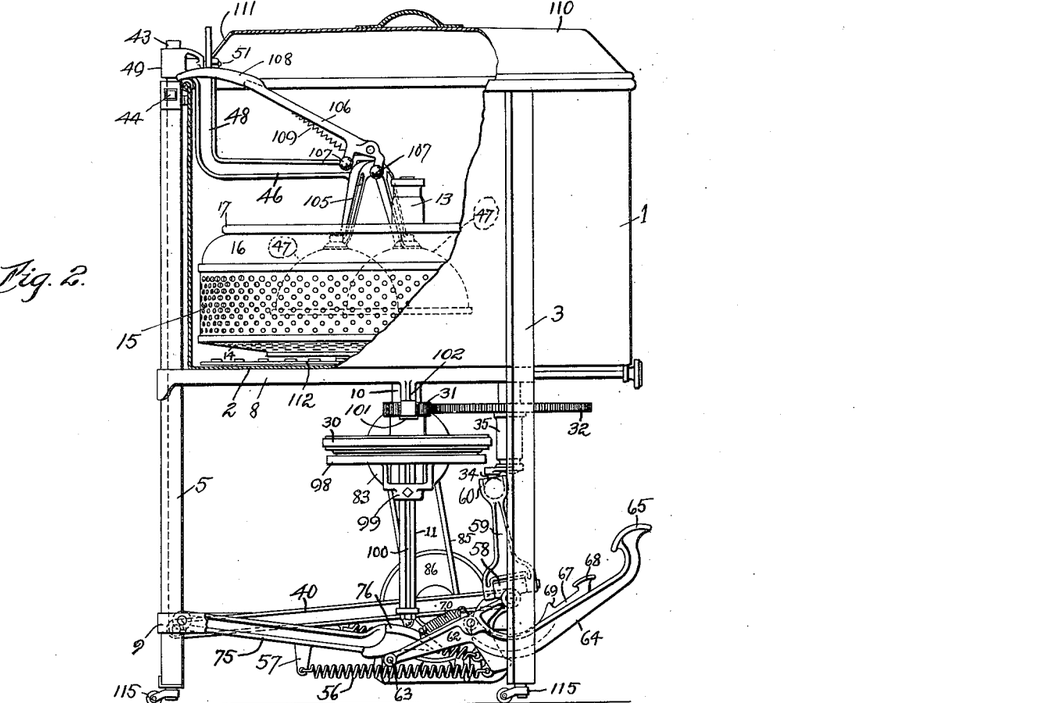
Fig. 2 is a view similar to Fig. 1 showing the washing devices at the lower limit of their stroke.

The top of the casing is preferably closed during the washing operation by means of a suitable cover 110, which, however, is formed at its rearward part with a notch 111 of sufficient size to accommodate the arm 48 and forks 108. In the casing beneath the tub or container I place an antisplashing member, adapted to ride upon the surface of the liquid during the wringing operation and prevent its being splashed against the revolving tub by the vibration of the casing; or being sucked up as a whirlpool by the air motion. I have shown and ordinarily employ a light wooden lattice 112, adapted to be depressed out of obstructing position when the tub is lowered as shown in Figs. 1, 2 and 3, and to float on the liquid surface in operating position when the tub is raised as shown in Fig. 4. This lattice is of a size to fit closely into the casing and has a central aperture 113 for the sleeve 13; although other constructions could be employed, and although the lattice shown herein is more complete than is normally required.

The lower ends of the legs 3, 4 and 5 are provided with casters or rollers 115, not for the purpose of facilitating transportation of the machine from place to place, but because the use of the same or their equivalent is found to be necessary to the use of the centrifugal wringing mechanism herein described. Even with the most perfect balancing of the clothes ordinarily achievable in practical operation, there will be considerable vibration of the tub when rotated at high speed, say about 600 revolutions per minute. If the legs 3, 4, 5 be set rigidly upon the floor, the entire vibration is necessarily thrown upon the upper part of the tub which causes such a splashing of the liquid and such a racking and wrenching of the construction as to render the device substantially useless; but by supporting the legs in a freely movable manner as by the use of these casters, the greater part of this vibratory motion is imparted to these legs which immediately execute a very lively dance upon the floor, while the casing and tub are left comparatively still, due apparently to their greater weight, so that splashing of the liquid is entirely overcome and the racking and wrenching of the structure very materially decreased. This movement of the casters is so pronounced that I ordinarily provide steel plates 116 with narrow rims 117 for the reception of these casters, since the machine will otherwise rapidly wear out any wooden or cement floor upon which it may be placed. Therefore I esteem the casters 115 or their equivalent an important and operative element of the combination for certain purposes and have so recited them in certain of the claims hereto annexed.

The container and framework are located upon opposite sides of the liquid position, which constitutes the center of mass of the stationary powers. The container and framework being both lighter than the casing and liquid, the effect of an unbalanced weight in the container is to vibrate the framework, in case the latter is yieldingly supported as described, the inertia of the casing and liquid serving to reduce the vibration and consequent splashing to a minimum. However if the framework be rigidly secured as by omitting the casters, so that a vibration outlet is denied, the casing and liquid will generally be violently agitated.

For the purpose of draining the casing I have shown a suitable outlet cock 120 located at the side of the machine opposite to the motor, and in combination with this cock I preferably use a suitable elevating device attached to the leg opposite thereto. Of course the major part of the liquid can be drawn out without any inclination of the casing, and the tipping of the casing is not a difficult matter when the liquid has been largely removed therefrom. However in the present embodiment I have illustrated an elevating device attached to the leg 4 and comprising a slotted plate 121 slidably secured upon the rivet 122 and having its upper end pivoted at 123 to a rocking plate 124 pivoted at 125. This plate is preferably formed with oppositely projecting arms 126 and 127 whereby it may be operated, and is so constructed and arranged that when the three pivots are brought substantially in line that leg will be elevated one or two inches above the floor and will be held in that position by means of a finger 128 on the plate engaging the side of the plate 121.

The operating mechanism is preferably inclosed in some kind of a housing, which in the present case consists of a U-shaped member 130 formed of thin sheet metal and secured to the outer faces of the frames 8 and 9, in combination with a curved, somewhat conical portion 131 secured to the forward face of the bars 6, 7 and inclosing the gears and levers. The sides of the member 130 are preferably cut away as shown at 132 to give access to the friction wheel, while the front portion of the member 131 is notched as shown at 133 for the reception of the pedals.

The operation of the device is as follows:

The casing 1 is first filled with water or other cleansing fluid for about one-third of its depth as shown in Fig. 3, clothing or fabrics to be washed being placed within the perforated tub, which is initially located in its lowered position, and the arm 46 with its bells 47 is clamped upon the rod 43 in the manner shown in Fig. 1. The tub being in its lowermost position, the gears 31 and 32 are in operative engagement, but the friction wheel 30 and clutch disk 98 are separated slightly as shown in Fig. 3. The electric motor 86 being operated in the usual manner, its movement is transmitted to the wheel 30 upon unscrewing the member 91 so that the spring 89 may draw the friction disk 83 against the wheel 30, whereupon the rotation of the gear 32 oscillates the lever 59 and with it the finger 52. Each upward lift of the finger 52 raises the arm 40 and with it the rod 43 and bells 47, while each downward movement of said finger permits the reverse movement of those parts under the influence of gravity and of the spring 55. Ordinarily these forces are sufficient to maintain the arm 40 in close contact with the cushion 53, but in case a too solid wad of clothing should intervene, or in case the arm of the operator were accidentally caught, no damage would result from the fact that the arm 40 would merely be arrested in its movement with consequent elongation of the spring 55. The rocking movement of the arm 54 also causes the lateral elongation and contraction of the spring 56, which is arranged to counterbalance to some extent the weight of the vertically reciprocable parts, thus equalizing to that exent the load upon the motor and permitting the employment of a smaller and less expensive motor.

During this washing operation the arms 62 and 75 retain the position illustrated in Figs. 1, 2, and 3, and without function other than the supporting of the shaft 11 in its lowermost position. However, the reciprocating movement of the rod 43 affords to the arm 106 an oscillating movement between the limits shown in Figs. 1 and 2, as a result of which the fingers 107, 107 swing the yoke 105 with its attached bells, first in one direction and then in the other; and since one of these swings occurs while the bells are approaching their most depressed position, and the reverse swing when the bells are in their raised position (and consequently wholly out of engagement with the tub or its contents), the result of this oscillation is to afford to the fabrics of clothing a continuous, slow progression in the same direction; which also carries with it the tub 15. As a result of this, two distinct results are secured; first that every portion of the clothing is subjected to the action of the bells, whereby they are mixed and kneaded and the water forced through them in the well known manner, the thoroughness of this action being apparently enhanced by the eccentric location of these bells; and, second, that the clothing or fabrics, even though introduced into the tub in a haphazard manner, soon become distributed around the same in a remarkably uniform manner so that upon the succeeding wringing operation no rearrangement is necessary and no objectionable vibration is encountered. The tub being entirely free to rotate the rotation of the clothing and the cleansing liquid carries it above at nearly or quite the same speed so that no snarling of the fabrics around the sleeve 13 takes place even after many hours of continuous operation, and no tearing or button-breakage ever occurs. During the washing operation the grid 112 is retained out of the way at the bottom of the case.

When the washing has proceeded to a sufficient extent, which ordinarily requires ten to fifteen minutes, the cover 110 is removed, (in case it were employed, as its only purpose is to prevent splashing), the set screw 51 is loosened and the arm 46 with its adjuncts is removed. The operator then places the foot upon the foot-plate 65 and depresses the pedal 64 to the position shown in Fig. 4 where it is retained by the action of the trigger lever 67. This movement raises the arm 75 and consequently the shaft 11, lifting the tub 15 above the liquid surface and releasing the grid 112 which now floats freely on that surface underneath the tub. When the cap member 12 of the shaft reaches the hub 99 of the clutch disk 98, it elevates the same into contact with the friction wheel 30, and in turn elevates said friction wheel along the member 10 so as to disengage the pinion 31 from the gear 32. This operation is effected without the necessity of stopping the motor or disengaging the friction disk 83 from the wheel 30. Its effect is to stop the operation of the arm 40 and its associated parts and instead thereof to connect the motor in high-speed driving-relation to the shaft 11. However, this high speed driving is not instantly effected inasmuch as the wheel 30 bears upon the clutch plate 98 only by its own weight, while the inertia of the tub 15 and its extremely wet contents is very considerable. The raising of the wheel 30 naturally brings it opposite a portion of the disk 83 which is more rapidly rotating so that its speed immediately becomes that desired for the tub, but the slipping between the wheel 30 and disk 98 permits a very gradual acceleration in the speed of the tub, during which time the liquid is draining naturally therefrom and is being thrown gently against the container wall. Simultaneously with the acceleration of the clutch plate 98 comes a lightening of the tub by the escape of water therefrom with the result that at the end of a few seconds or minutes the parts are revolving at topmost speed. Whatever inequality in the balance of the clothes may exist is taken up by the vibration of the legs 3, 4 and 5 in the manner heretofore explained, with the result that the casing with its liquid contents is left comparatively unshaken and slopping or splashing prevented; while the rippling of the surface and the formation of any whirlpools is prevented by the grid 112.

Under ordinary conditions, clothing or fabrics of any nature can be dried by this whirling operation in two or three minutes more thoroughly than by a roller wringer no matter how tightly adjusted; and this result is effected without the necessity of the operators wetting the hands and without the distorting, creasing, rumpling, or button breaking results occasioned by a roller wringer. At the end of this short wringing period the clothing can be removed and hung upon the line or otherwise dried; or, in case the weather be inclement or time at a premium, the whirling operation can be continued for ten minutes longer and the fabrics will be sufficiently dried for immediate ironing.

The stoppage of this rotation is effected by screwing inwardly the member 91 so as to disengage the friction disk from the friction wheel 30, whereupon the tub will gradually come to rest; the stoppage can be facilitated by resting the hands gently upon the rolled rim 17 thereof, but can be more rapidly secured by pressing again upon the pedal 67 so as to raise the wheel 30 a short distance which brings it into contact with the brake shoe 101 heretofore mentioned, whereby its rotation is very rapidly retarded.

The clothing or fabrics being now removed, the operator places the foot upon the plate 65 with the toe upon the lever 67, whereupon the pedal 64 is unlocked and returned to the position shown in Figs. 1 and 3.

A new batch of clothing is now introduced into the tub and arm 46 reapplied and the operation repeated.

Having thus described my invention, what I claim is:—

1. In a laundrying device for miscellaneous clothing, a container journaled for revolution about a vertical axis, means for distributing miscellaneous clothing uniformly about said container, and means for rotating said container at high speed.

2. In a washing machine for miscellaneous laundrying, a combined washing and wringing container, means operative during one part of the operation for simultaneously washing and distributing the laundry-articles in said container, and means operative after such distribution for rotating said container at high speed.

3. The combination with a centrifuge of means for distributing miscellaneous fabrics uniformly therein.

4. In a device of the character described, a casing, a foraminous container therein, a power source, means driven by said power source for distributing miscellaneous fabrics evenly inside said container, and mechanism for rotating said container at high speed whereby said fabrics may be dried.

5. In a device of the character described, a casing, a foraminous container therein adapted to occupy either the lower or the upper part of said casing, power operated means coöperating with said container while the same is in the lower part of said casing for distributing fabrics evenly therearound, mechanism for elevating said container and for automatically stopping the operation of said distributing means simultaneously therewith, and means for thereafter rotating said container at high speed.

6. In a laundry machine, a centrifugal container, a liquid tight casing about said container and adapted to hold the liquid wherein said container may be immersed, a pounder arranged between the center and circumference of said container, means for reciprocating said pounder vertically, and means operative simultaneously with the vertical movement for shifting said pounder bodily in a lateral direction during the time that the same is in close proximity to the bottom of said container.

7. In a washing machine, a rotatable circular container having its axis vertical, a plurality of pounders arranged between the center and circumference of said container, means for reciprocating said pounders vertically, and means for oscillating said pounders to and fro during such reciprocation, one direction of oscillation always occurring while a pounder is in close proximity to the bottom of its stroke and the other part of said oscillation occurring near the top of its stroke, the oscillatory movement of both pounders being in the same angular direction relatively to said container.

8. In a device of the character described, a cylindrical upright container, a vertically reciprocable member overhanging said container, a yoke pivoted to said member upon a vertical axis at a point near the axis of said container, pounders carried by said yoke between the center and circumference of said container, means for reciprocating said member, and means operative upon the approach of said pounders to the bottom of their stroke for shifting said yoke angularly about its axis.

9. In a device of the character described, a cylindrical upright container, a vertically reciprocable member overhanging said container, a yoke pivoted to said member upon a vertical axis at a point near the axis of said container, pounders carried by said yoke between the center and circumference of said container, means for reciprocating said member, means operative upon the approach of said pounders to the bottom of their stroke for shifting said yoke angularly about its axis, and means operative upon the approach of said member to the top of its stroke for restoring said yoke to its initial position.

10. In a device of the character described, a casing, a foraminous container pivoted upon a vertical axis for free rotation therein, a pounder arranged between the center and circumference of said container, means for reciprocating said pounder vertically, and means operative while said pounder is near the bottom of its stroke for shifting the same circumferentially of said container, the direction of successive shifts being always the same.

11. In a washing machine, an upright container, a vertically reciprocable member overhanging said container, a yoke pivoted to said member upon a vertical axis eccentric to the container axis, pounders carried by said yoke and arranged between the center and circumference of said container, means for vertically reciprocating said member, and means for simultaneously oscillating said yoke about its axis.

12. In a washing machine, an upright casing, a vertical reciprocating rod arranged in upright position at the side of said casing, a horizontal arm secured to said rod and overhanging said casing, a yoke pivoted to said arm upon a vertical axis, pounders carried by said yoke and arranged between the center and circumference of said casing, a lever pivoted to said arm upon a horizontal axis and having spaced fingers depending one on each side of said yoke, the opposite end of said lever being held in engagement with a fixed part of said casing, and means for reciprocating said rod vertically.

13. In a combined washing and centrifugal drying machine, a casing adapted to hold cleansing liquid in its lower part, a foraminous container swiveled upon a vertical axis within said container and movable vertically into or out of said liquid without being removed from said container, means operative during the time that said container is in its lower position for washing clothing or fabrics therein and distributing the same evenly around said container, a power source, means operatively connecting said power source to said washing and distributing devices during the time that said container is in lower position, and means for raising said container out of said liquid and for simultaneously disconnecting said power source from said washing and distributing devices and connecting the same to said container so as to rotate the same rapidly about its axis.

14. In a device of the character described, an upright container, a plurality of pounders supported between the center and circumference of said container, means for reciprocating said pounders vertically, and means operative upon the approach of said pounders to the bottom of their stroke for shifting them angularly about said container, the shifting movement of all of said pounders being in the same angular direction relative to said container.

15. In a device of the character described, a cylindrical upright container, a supporting member, a yoke pivoted to said member, at a point near the axis of said container, pounders carried by said yoke between the center and circumference of said container, means for moving said yoke so as to reciprocate said pounders vertically, and means operative upon the approach of said pounders to the bottom of their stroke for shifting the same angularly about said container, the direction or shift of said pounders being always in the same angular relation relatively to the said container.

16. In a device of the character described, in combination, an upright container, a supporting member, a yoke pivoted to said member at a point near the axis of said container, pounders carried by said yoke between the center and circumference of said container, means for operating said yoke so as alternately to elevate and depress said pounders, and means operative upon the approach of each pounder to the bottom of its stroke, for shifting the same angularly about its axis in one direction, and upon the approach of each pounder to the top of its stroke for restoring the same to its initial position, the direction of shift of all of said pounders being in the same angular direction relatively to said container.

In testimony whereof, I hereunto affix my signature.

JAMES B. KIRBY.